United States Patent
Scholtes et al.

(10) Patent No.: US 9,477,750 B2
(45) Date of Patent: *Oct. 25, 2016

(54) SYSTEM AND METHOD FOR REAL-TIME DYNAMIC MEASUREMENT OF BEST-ESTIMATE QUALITY LEVELS WHILE REVIEWING CLASSIFIED OR ENRICHED DATA

(71) Applicant: MSC INTELLECTUAL PROPERTIES B.V., Amsterdam (NL)

(72) Inventors: Johannes Cornelis Scholtes, Bussum (NL); Yuriy Pasichnyk, Amsterdam (NL)

(73) Assignee: MSC INTELLECTUAL PROPERTIES B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,747

(22) Filed: Oct. 26, 2015

(65) Prior Publication Data

US 2016/0048587 A1    Feb. 18, 2016

Related U.S. Application Data

(63) Continuation of application No. 13/802,164, filed on Mar. 13, 2013, now Pat. No. 9,171,072.

(51) Int. Cl.
*G06N 7/00* (2006.01)
*G06F 17/30* (2006.01)
*G06N 99/00* (2010.01)

(52) U.S. Cl.
CPC ... *G06F 17/30705* (2013.01); *G06F 17/30011* (2013.01); *G06N 7/005* (2013.01); *G06N 99/005* (2013.01)

(58) Field of Classification Search
CPC .......................................................... G06N 7/05
See application file for complete search history.

(56) References Cited

U.S. PATENT DOCUMENTS 8,713,007 B1 * 4/2014 Korolev ................ G06N 5/048
707/729

* cited by examiner

*Primary Examiner* — Stanley K Hill
*Assistant Examiner* — Ola Olude Afolabi
(74) *Attorney, Agent, or Firm* — Carlos R. Villamar; The Villamar Firm PLLC

(57) ABSTRACT

A system, method and computer program product for validating a document classification process, including a document collection; a document classification process performed on the document collection; a random selection module configured to automatically generate a random validation set of documents from the document collection; and a document review process performed on the random validation set of documents to validate results of the document classification process. The system, method and computer program product are configured to dynamically and in real-time measure and display on a computer display device a best case estimate of a quality of the results of the document classification process based on the documents that are validated, and given a size of a total data set of the document collection.

18 Claims, 6 Drawing Sheets

SYSTEM AND METHOD FOR REAL-TIME DYNAMIC MEASUREMENT OF BEST-ESTIMATE QUALITY LEVELS WHILE REVIEWING CLASSIFIED OR ENRICHED DATA

CROSS REFERENCE TO RELATED APPLICATIONS

The present invention is a continuation of, U.S. patent application Ser. No. 13/802,164 of Scholtes et al., entitled "SYSTEM AND METHOD FOR REAL-TIME DYNAMIC MEASUREMENT OF BEST-ESTIMATE QUALITY LEVELS WHILE REVIEWING CLASSIFIED OR ENRICHED DATA," filed on Mar. 13, 2013, now allowed, the entire contents of all of the disclosures of which are hereby incorporated by reference.

BACKGROUND OF THE INVENTION

1. Field of the Invention

The present invention generally relates to systems and methods for validating data, and more particularly to systems and methods for real-time, dynamic measurement and display of a best case estimate of results of a review of a randomly selected validation set, and the like.

2. Discussion of the Background

In recent years, systems and methods for validating data have been developed. However, such systems and methods lack robustness with respect to real-time, dynamic measurement and display of a best case estimate of results of a review of a randomly selected validation set, and the like.

SUMMARY OF THE INVENTION

Therefore, there is a need for a method and system that addresses the above and other problems with systems and methods for validating data. The above and other problems are addressed by the illustrative embodiments of the present invention, which provide improved systems and methods for real-time, dynamic measurement and display of a best case estimate of results of a review of a randomly selected validation set, and the like. The method and system creates a random validation set after a manual or automatic classification or data entry process, and during a manual or automatic review of the quality of such validation set, the method and system dynamically and in real-time measure and present the best case estimate of the quality results given the documents that are validated, and given the size of the total data set, and the like. By closely monitoring such best case estimate, users can decide to stop reviewing remaining documents when a best case estimate is at a certain moment lower than a predetermined quality threshold, and the like.

Accordingly, in illustrative aspects of the present invention there is provided a system, method, and computer program product for validating a document classification process, including a document collection; a document classification process performed on the document collection; a random selection module configured to automatically generate a random validation set of documents from the document collection; and a document review process performed on the random validation set of documents to validate results of the document classification process. The system, method and computer program product are configured to dynamically and in real-time measure and display on a computer display device a best case estimate of a quality of the results of the document classification process based on the documents that are validated, and given a size of a total data set of the document collection.

The system, method and computer program product are configured to allow a user to monitor the best case estimate and terminate the document review process and change parameters and/or instruction for the document classification process based on the best case estimate being equal to or lower than a predetermined quality threshold.

The system, method and computer program product are configured to allow the user to accept the document review process based on the best case estimate being equal to or higher than the predetermined quality threshold.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
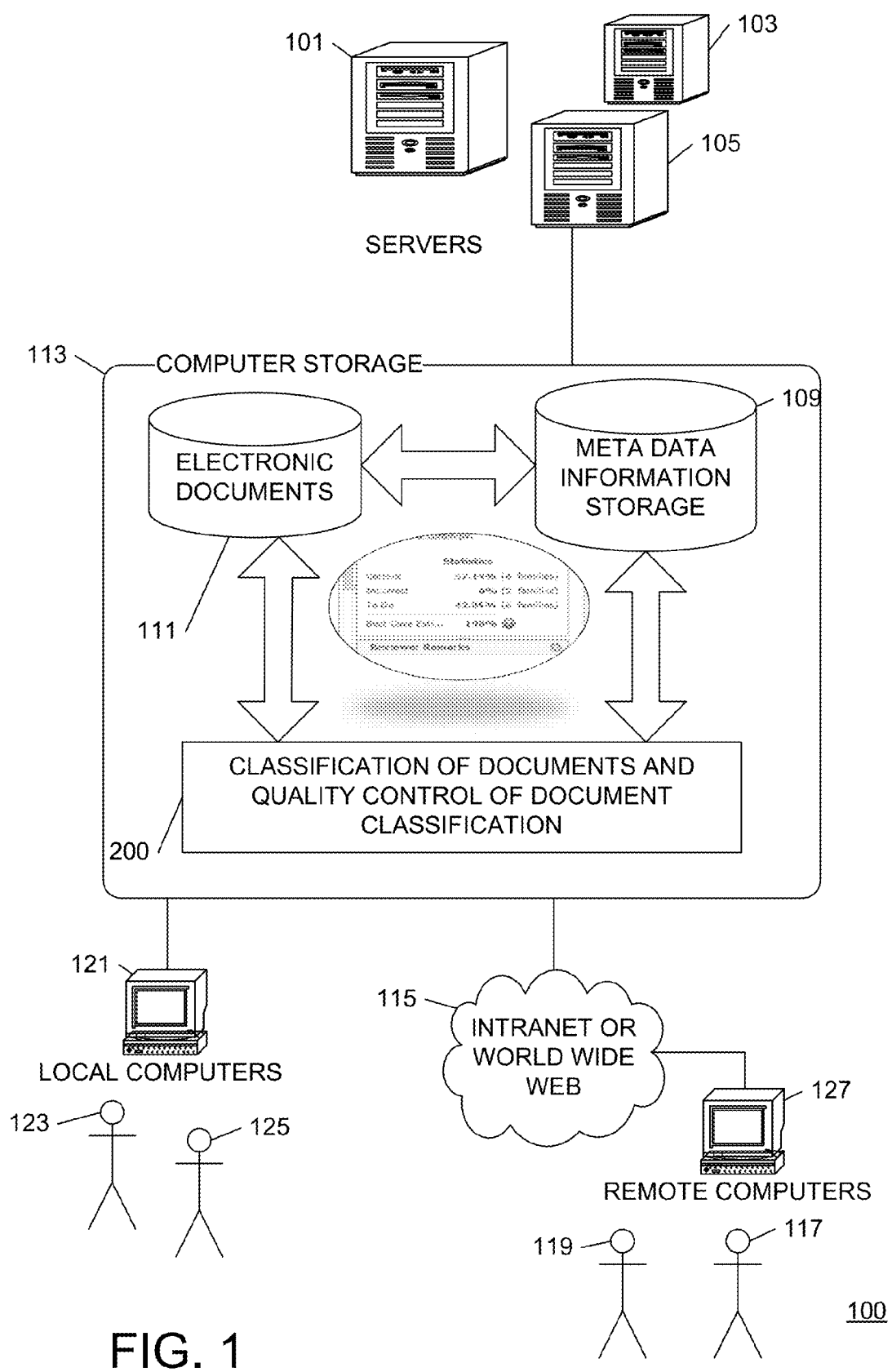
FIG. 1 is an illustrative system for dynamically measuring a best case estimate of quality of a document review process.

The present invention includes recognition that document review is an important part of an eDiscovery process, where lawyers or investigators review documents and manually classify them in various document categories, such as privileged, confidential, responsive, and the like. This is a very labor intensive process and typically the most expensive part of a pre-trial eDiscovery, and the like. In the legal technology market, such applications are referred to as Predictive Coding, Technology Assisted Review (TAR), Machine Assisted Review (MAR), Computer Assisted Review (CAR), and the like. A similar and expensive review process of evidentiary material exists in internal investigations, law enforcement activities, compliance audits, and the like. In addition, records managers, business users, and the like, who, for example, need to clean-up legacy data, have to review data as part of a defensible disposition process, and the like The present invention includes recognition that manual reviews during eDiscovery and legacy information clean-up, and the like, typically are the most expensive components of such processes, wherein estimates vary from 40-65% of the total cost of a project. As the size of electronic data collections continues to grow exponentially, it is impossible to continue reviewing documents manually. Automatic document classification is a reasonable solution to review the ever growing document sets and automatically classify documents into predefined (e.g., so-called supervised document classification) or automatically generated categories (e.g., so-called unsupervised document classification) by using techniques, such as machine learning, rule-based classification, key-word based classification, concept search, content analytics, text-mining, and the like, clustering based on techniques, such as decision trees, support vector machines (SVM), naive-Bayes classifiers, k-nearest neighbors, rules-based classification, Linear discriminant analysis (LDA), Maximum Entropy Markov Model (MEMM), scatter-gather clustering, hierarchical agglomerate clustering (HAC), and the like. Accordingly, the present invention includes recognition that automated, intelligent, and the like, processes can be applied to better focus the collection, efficiently code and classify data, significantly reduce the review costs, and the like.

The present invention includes recognition that both manual and automatic document classification is not perfect, and because the quality levels may vary due to many external influences, it is not possible to predict the quality levels of an automatic classification process beforehand or even after an automatic classification process has completed. Therefore, a manual verification of the quality of the automatic classification is advantageous in order to measure the quality of an automatic classification process and so as to make the usage of the corresponding classification technology defensible in court or within the context of business processes, and the like.

In some cases, manual and automatic document review workflows are combined. In such a case, the quality of the manual review part can also be challenged, especially if this is done overseas or by low-cost contract lawyers or investigators who may not have been instructed properly.

Defensibility, auditing, quality control, chain of custody, and the like, are paramount for classification processes during eDiscovery, internal investigations, law enforcement activities, compliance audits, records management, legacy data clean-up, defensible dispositions, and the like. Without being able to explain in court exactly how the classification process was implemented and executed, one will have a hard time defending their case against an opposing party, counsel, and the like. In addition, if the quality of a classification process is successfully challenged in court, the time and money saved by either automating or outsourcing the classification process may cost more in the end; especially if one has to redo all the work with stricter deadlines, and with the burden of penalties, sanctions, fines, a damaged reputation, and the risk of additional litigation, and the like, resulting in malpractice, and the like.

In validating the quality of a classification processes, wherein it may not be possible to verify the quality of all classified documents, a proven best practice is to randomly create a sample set and verify the quality of that sample set. Typically, sample sets are 1-5% of the size of the entire data collection. One can statistically assume that the quality of the classification of the entire data set is the same as that from the randomly selected sample set. This best practice for quality control is accepted the field of eDiscovery, internal investigations, law enforcement activities, compliance audits, records management, legacy data clean-up, defensible disposition, and the like, in relation to the verification of an automated or manual classification or data entry process, and the like. Typically, parties will agree in advance upon an acceptable threshold (e.g., a quality rating of above 80% accuracy) as a minimal level to accept the quality of the document classification process. Depending on the outcome of the manual verification, the results from the classification process can be accepted or rejected. When rejected, the parameters of the classification process can be adjusted and then re-sampled to verify a satisfactory improvement. Alternatively, the team can opt to perform the work manually, for example, if automation is deemed inappropriate for that process.

One of the problems of such manual verification of the quality of a randomly selected validation set is that one could still be reviewing documents in the sample set, whilst one does not know that given the results of the documents that are viewed, one will no longer be able to match the agreed threshold for acceptance of the document classification process. This is especially true if one works in larger team where multiple reviewers are manually validating the results of the classification of the documents in the validation set.

Accordingly, data sampling can be used to remove doubt and uncertainty about the quality of document classification in eDiscovery, internal investigations, law enforcement activities, compliance audits, records management, legacy data clean-up, defensible dispositions, and the like. However, there is still room for improvement in such processes, especially with respect to the dynamic measuring of the best estimate results of the manual validation.

Various approaches have been applied to validating the quality of document classification and data entry processes. However, such approaches typically do not take into consideration the fact that review teams could still be reviewing documents in a randomly selected validation set, whilst the overall results of the document classification of the already reviewed documents is of such low quality that the agreed threshold for acceptance of the automatic classification can never be reached. This is especially true when dealing with large teams of multiple reviewers, resulting in a waste of resources, time and money, and the like.

Therefore, there is a need for better real-time methods to dynamically measure and present a best case estimate of the results of the review of the randomly selected validation set, so users can stop reviewing a sample set as soon as the know that the agreed threshold cannot be reached. The errors of the document classification can then be addressed by changing the parameters of the document classification or data entry or by reinstructing and retraining manual labor, and then creating a new validation cycle, instead of wasting time, resources and money on reviewing documents of which one already knows that agreed quality threshold will never be met.

The illustrative systems and methods provide for real-time, dynamic measurement and presentation of a best case estimate of results of reviews of a randomly selected validation set. For example, after a manual (e.g., often outsourced to areas or countries with low labor cost) or automatic classification process, where documents are classified, or certain artifacts are recognized, such as identification of personal identifiable information (PII) for redaction or the extraction of any suitable type of semantic information, such as recognition of named entities, and the like, techniques, for example, such as gazetteers, dictionaries, regular expressions, rules, patterns, Hidden Markov Models, Support Vector Machines, Maximal Entropy Models and other suitable statistics, and the like, can be used to classify the named entities into structural, syntactic, semantic and pragmatic classes, for example, such as person, city, country, address, job title, credit card number, social security number, and the like, but also more complex relations, for example, such as sentiments, locations, problems, route, concepts, facts, events, and thousands more such roles and meanings, and the like. Any suitable type of technology can be used for the automatic classification or analysis of documents, such as automatically classifying documents into predefined (e.g., so-called supervised document classification) or automatically generated categories (e.g., so-called unsupervised document classification) by using suitable techniques, such as machine learning, rule-based classification, key-word based classification, concept search, content analytics, text-mining, and the like, clustering based on suitable techniques, likesuch as decision trees, support vector machines (SVM), naïve-Bayes classifiers, k-nearest neighbors, rules-based classification, Linear discriminant analysis (LDA), Maximum Entropy Markov Model (MEMM), scatter-gather clustering, and/or hierarchical agglomerate clustering (HAC), and the like.

After having classified or analyzed all suitable documents in a document collection, the method and system creates a random validation set after the manual or automatic classification or data entry process. Any suitable type of accepted statistical model for the creation of a random set can be used, such as Normal, Gaussian, Student, Poisson distribution, Bernoulli distribution, binomial, or geometric distribution, and the like. Any suitable type of size can be selected (e.g., a percentage of the total data set or an absolute document number, etc.).

Such randomly selected validation set is then distributed over a review team and all the suitable documents are manually or automatically reviewed to determine if the quality of the classification, data entry or extraction is correct. Thereafter, the best case estimate is re-calculated, for example, according to the following formula:

NEW BEST CASE ESTIMATE is: (the sum of NUMBER OF SO-FAR PROPERLY CLASSIFIED DOCUMENTS and the NUMBER OF DOCUMENT TO REVIEW) divided by (NUMBER OF TOTAL DOCUMENTS IN RANDOM SET)

Accordingly, the method and system dynamically provide a real-time measurement and present a best case estimate of the quality of the results, given the documents that are validated, and given the size of the total data set. By closely monitoring such best case estimate, users can decide to stop reviewing the remaining documents, for example, when the best case estimate is at a certain moment lower than the agreed quality threshold, and can suitably change the parameters or instruction of the classification, data entry or extraction process, and the like. For example, if the entire randomly selected validation set is reviewed, and if the result of the validation is larger than a predefined threshold, then the classification, data entry or extraction of the entire set can be accepted.

Referring now to the drawings, wherein like reference numerals designate identical or corresponding parts throughout the several views, and more particularly to FIG. 1 thereof, there is illustrated a system for dynamically measuring a best case estimate of quality of a document review process. In FIG. 1, generally, the system 100 provides a method and system for dynamically measuring a best case estimate of quality by using manual or automatic classification, data entry, redaction or extraction of information from documents and then checking the quality of such process by creating a random validation set, which is much smaller than the total data set, and which is then manually or automatically verified for quality by one or more reviewers in a computer network, and the like.

During such processing, the method and system dynamically measures and presents the best case quality estimate. The system includes for example, a document storage subsystem 113 (e.g. a computer storage device, etc.) including one or more document collections 111, one or more document meta data information storage devices 109, and one or more systems for manual or automatic classification, data entry and extraction of documents, including quality control of such process at 200, accessed through one or more servers 101, 103 and 105. The system 100 can be used for manual or automatic classification, data entry and extraction of documents, creating a random validation set, which is much smaller than the total data set, and for manual or automatic verification of the quality by one or more reviewers in a computer network.

One or more local computers 121 can provide connectivity to one or more users 123 and 125, for example, via a local-area network (LAN), and the like. Similarly, one or more remote computers 127 can provide connectivity to one or more remote users 117 and 119, for example, via the Internet, an Intranet, a wide-area network (WAN) 115, and the like. Accordingly, the computers 121 and 127 connect to the document storage subsystem 113 and to allow the one or more users 123, 125, 119 and 117 to manually or automatically access the document collection 111, view documents, document groups, document meta information, training documents, training results, machine learning models, document classifications, names, authorships, aliases, and the like.

In addition, servers 101, 103 and 105 communicate with the computer storage subsystem 113 to extract meta data information at 109 for each document in the document collection 111. Accordingly, the users 123, 125, 119 and 117 can access the document collection 111 by using the computers 121 and 127 connected over a LAN or the Internet or Intranet 115.

Figure 2:
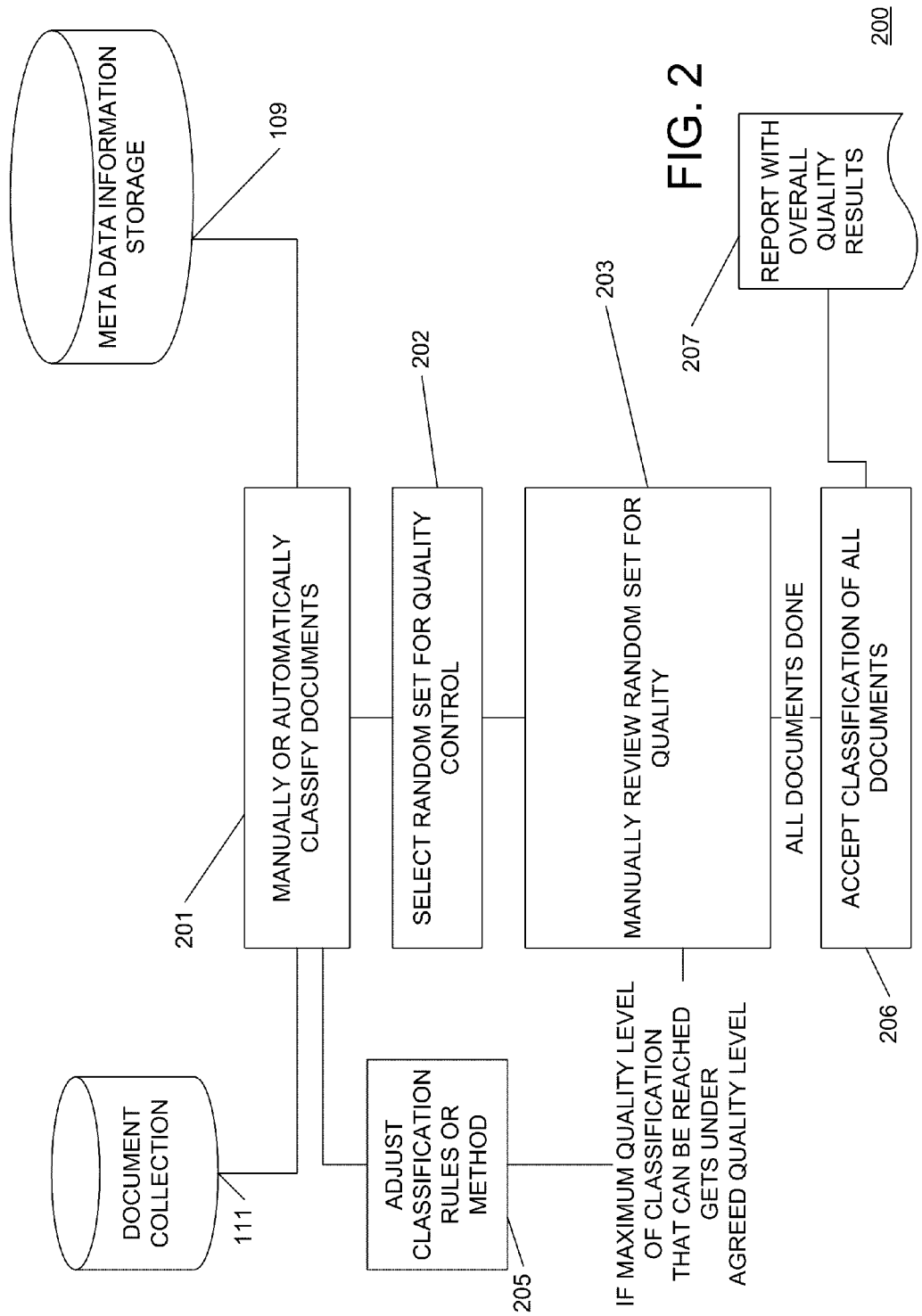
FIG. 2 is an illustrative process to classify documents and measure a best case estimate of a quality thereof.

FIG. 2 is an illustrative process 200 to classify documents and measure a best case estimate of a quality thereof. In FIG. 2, the illustrative process 200 can be used for classifying or analyzing (e.g., data extraction, data entry, etc.) documents, and for real-time measuring of the quality level of such process. For example, at step 201, the system and method include a manual (e.g., often outsourced to areas or countries with low labor cost) or automatic classification process where documents from the document collection 111 with meta data 109 are classified, or certain artifacts are recognized, such as the identification of personal identifiable information (PII) for redaction or the extraction of any suitable type of semantic information, such as recognition of a named entity, and the like, using techniques, such as gazetteers, dictionaries, regular expressions, rules, patterns, Hidden Markov Models, Support Vector Machines, Maximal Entropy Models and other suitable statistics, and the like, that can be used to classify the named entities into structural, syntactic, semantic and pragmatic classes, for example, such as person, city, country, address, job title, credit card number, social security number, and the like, but also more complex relations, for example, such as sentiments, locations, problems, route, concepts, facts, events, and thousands more such roles and meanings, and the like.

Any suitable type of technology can be used for the automatic classification or analysis of documents, such as automatically classifying documents into predefined (e.g., so-called supervised document classification) or automatically generated categories (e.g., so-called unsupervised document classification) by using suitable techniques, such as machine learning, rule-based classification, key-word based classification, concept search, content analytics, text-mining, clustering, and the like, based on suitable techniques such as decision trees, support vector machines (SVM), naïve-Bayes classifiers, k-nearest neighbors, rules-based classification, Linear discriminant analysis (LDA), Maximum Entropy Markov Model (MEMM), scatter-gather clustering, and/or hierarchical agglomerate clustering (HAC), and the like. The additional meta data information obtained in the process step 201 can also be stored in the meta data storage device 109.

At step 202, a random set for verification is created. On the front end, associates, paralegals and litigation support professionals can simply select the parameters they wish to sample and then run the randomizer on-the-fly. A good data sampler can provide a customizable and intuitive wizard interface with a random sequence algorithm running behind the scenes. The sampling ratio is generally dictated by lead counsel based on risk tolerance, the purpose of the sample, and industry benchmarks for different scenarios (e.g., if applicable). Any suitable type of accepted statistical model for the creation of the random set can be used, such as Normal, Gaussian, Student, Poisson distribution, Bernoulli distribution, binomial, or geometric distribution, and the like. Any suitable size can be selected (e.g., percentage of total data set or an absolute document number).

Such a data sampler can present a step-by-step process for end-users, such as:

(1) Select Source. Select the data population, such as the complete data universe, a sample set of backup tapes, a complex search query, or documents tagged as privileged.

(2) Measure. Run a baseline query to measure the size of the population.

(3) Set Parameters. Define the desired size of the sample, such as 5% or a quantity of documents, based on counsels' thresholds for error, confidence level, and sample size.

(4) Run the Sampler. The software generates and displays the random sample in a simple, optimized and constrained review tool.

(5) Analyze. Select the property to validate, such as keywords, responsiveness, codes, or custodians.

(6) Validate and Report. Reviewers code the sample documents for accuracy, such as Correct/Incorrect or Yes/No, and the system tracks the progress and provides full reporting.

Parameters and results of every data sample can be logged, for example, in order to provide complete transparency, repeatability, defensibility, and the like. Such reports can capture elements, such as what was sampled, who was sampled, dates of the sample, sample sizes, how many were correct, how many were incorrect, corresponding percentages, and the like. Such information can be used as part of defensibility of search terms, for example, when an agreement cannot be reached, as well as during due diligence on privilege coding, and the like. Data samples also can be used for quality control of reviewers, production sets, and the like, and for burden and proportionality arguments, and the like.

At step 203, such randomly selected validation set is then distributed over a review team and all the documents are manually or automatically reviewed to determine if the quality of the classification, data entry or extraction is correct. The method and system dynamically provides a real-time measure and present a best case estimate of the quality results given the documents that are validated and given the size of the total data set. By closely monitoring this best case estimate, users can decide to stop reviewing the remaining documents, for example, when the best case estimate is at a certain moment lower than the agreed quality threshold, and can change the parameters or instruction of the classification at step 205, can change the data entry or extraction process and restart the process at step 201.

If the entire randomly selected validation set is reviewed, and if the result of the validation is larger than the predefined threshold, then the classification, data entry or extraction of the entire set can be accepted at step 206, and a report 207 of the validation process and quality can be generated. Such report 207 can be advantageous for the defensibility of the process, documentation of the quality levels and the quality control process, and the like.

Figure 3:
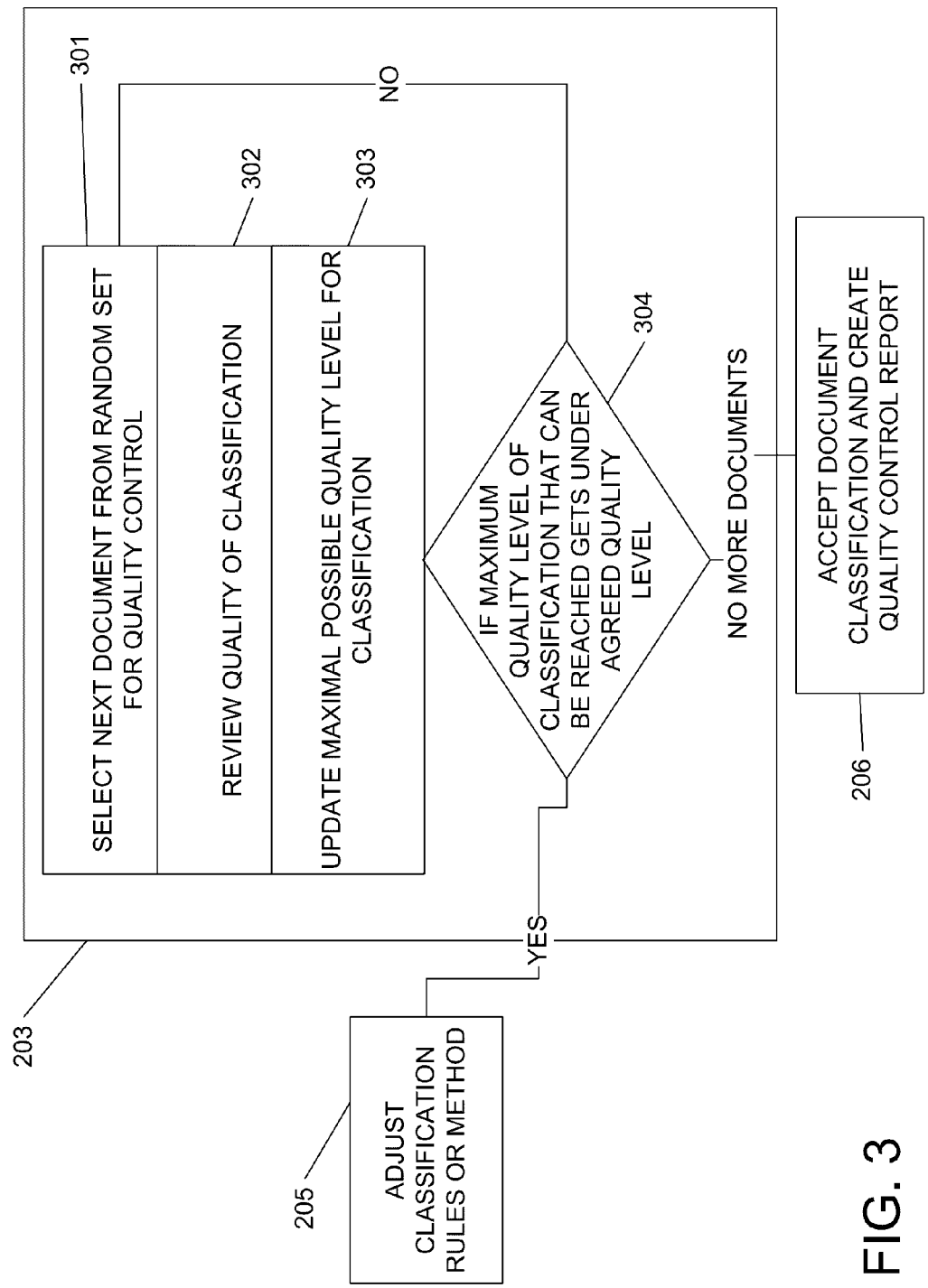
FIG. 3 is an illustrative process step to dynamically measure a best case estimate of quality of a sample set given current review results.

FIG. 3 is an illustrative process step 203 to dynamically measure a best case estimate of quality of a sample set given current review results. In FIG. 3, the step 203, wherein a randomly selected validation set can be distributed to a review team is shown in more detail. Each member of the review team gets assigned or selects a document for quality control at step 301. At step 302 all the documents are manual or automatically reviewed to determine if the quality of the classification, data entry or extraction is correct. In step 303, in real-time, the best case estimate of the quality results is measured given the documents that are validated and given the size of the total data set. By closely monitoring this best case estimate in step 304, users can decide to stop reviewing the remaining documents, for example, when the best case estimate is at a certain moment lower than the agreed quality threshold, and can change the parameters or instruction of the classification at step 205, can change the data entry or extraction process and restart the process at step 301. If the entire randomly selected validation set is reviewed, and if the result of the validation is larger than the predefined threshold, then the classification, data entry or extraction of the entire set can be accepted at step 206.

Figure 4:
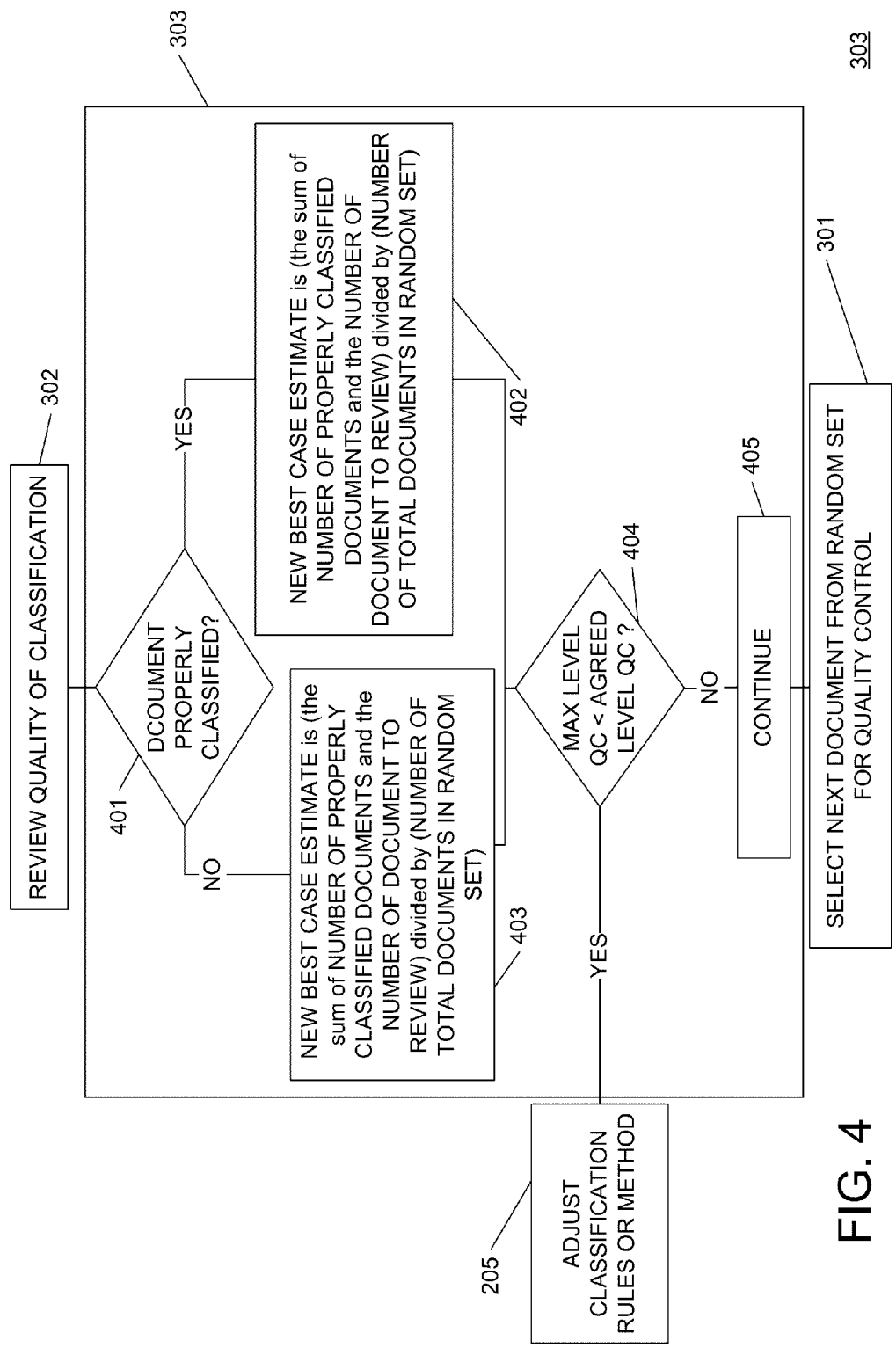
FIG. 4 is an illustrative process step to calculate a best case estimate of quality of a sample set given current review results.

FIG. 4 is an illustrative process step 303 to calculate a best case estimate of quality of a sample set given current review results. In FIG. 4, after step 302, wherein documents are reviewed to determine the quality of the classification, the details of the monitoring of the best case estimates of step 303 is describe in further detail. At step 401, one determines if the quality of the classification, data entry or extraction is correct or not. At step 403 or 402, depending on the result of the quality control step 401, the best case estimate is re-calculated, for example, according to the following formula:

> NEW BEST CASE ESTIMATE is: (the sum of NUMBER OF SO-FAR PROPERLY CLASSIFIED DOCUMENTS and the NUMBER OF DOCUMENT TO REVIEW) divided by (NUMBER OF TOTAL DOCUMENTS IN RANDOM SET)

At step 404, the method and system dynamically provides the real-time measure and presents the best case estimate of the quality results given the documents that are validated and given the size of the total data set. By closely monitoring this best case estimate, users can decide to stop reviewing the remaining documents, for example, when the best case estimate is at a certain moment lower than the agreed quality threshold, and can change the parameters or instruction of the classification, data entry or extraction process at step 205, or continue to step 405 and then select the next document for quality control at step 301.

Figure 5:
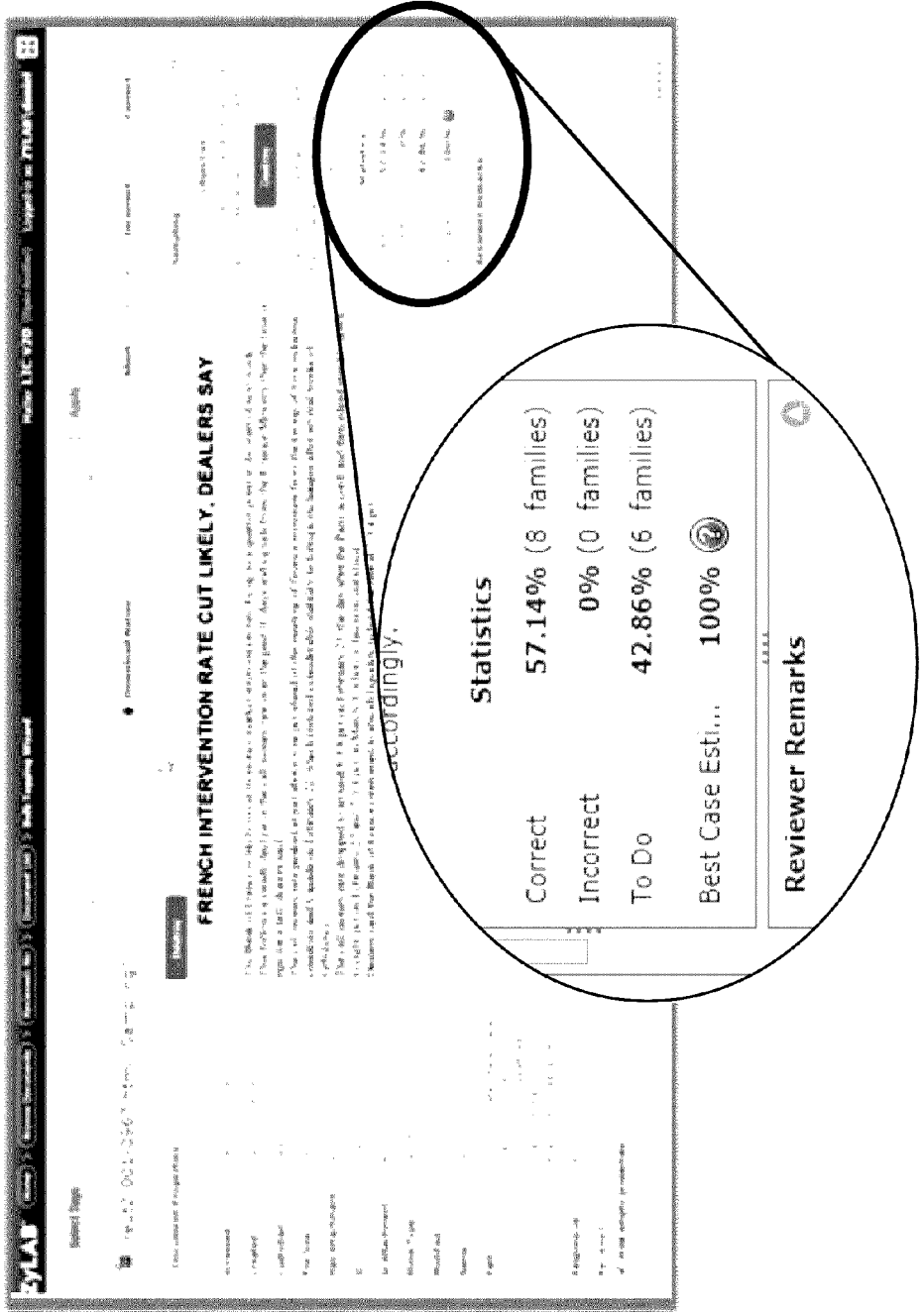
FIG. 5 is an illustrative screenshot of a best case estimate of quality of a sample set given current review results.

FIG. 5 is an illustrative screenshot 500 of a best case estimate of quality of a sample set given current review results. In FIG. 5, as shown, the user interface screen can provide suitable statistics, such as percentage correct, percentage incorrect, percentage remaining, best case estimate, and the like.

Figure 6:
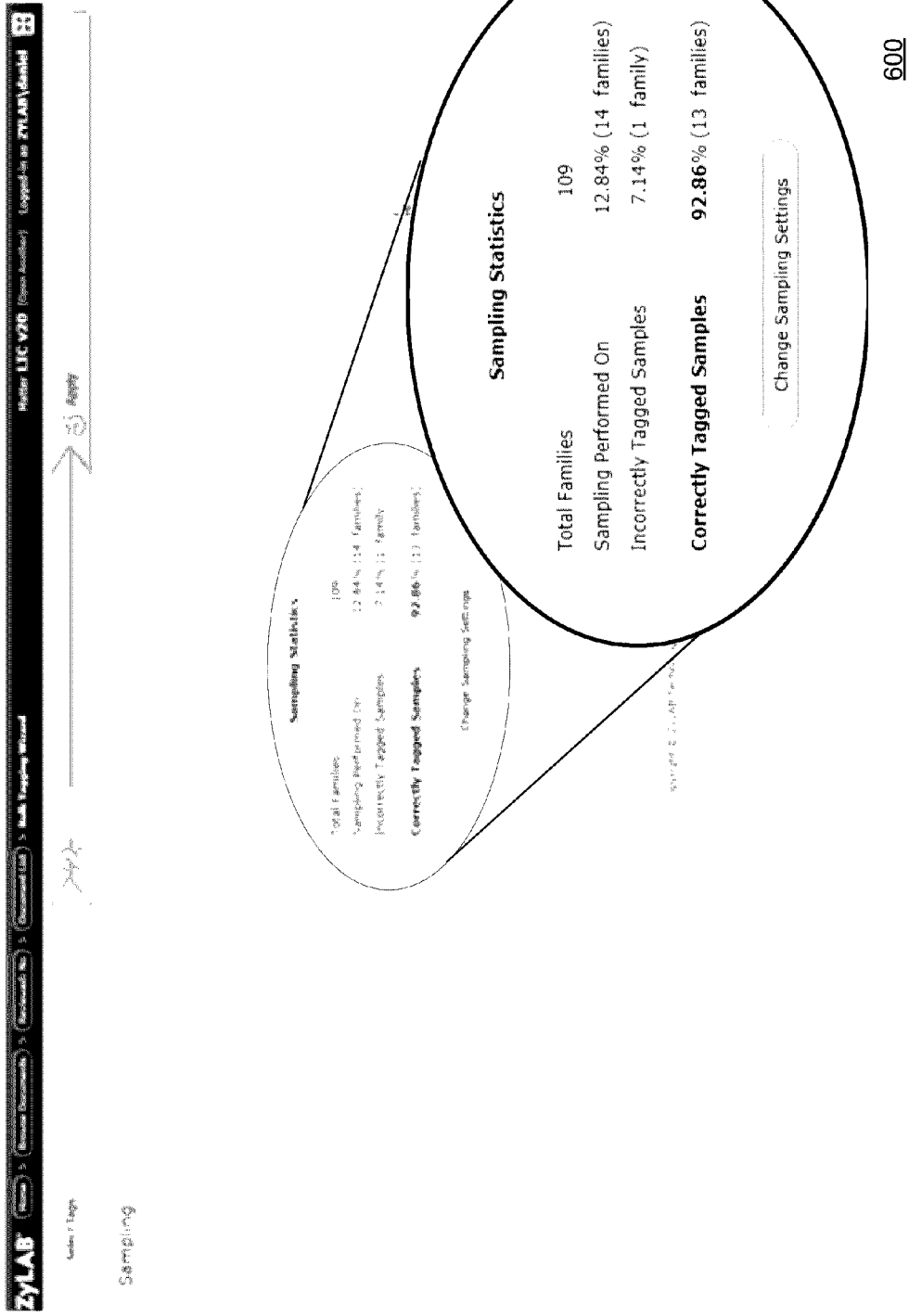
FIG. 6 is an illustrative screenshot of overall results of a manual or automatic review of a quality of an entire sample set.

FIG. 6 is an illustrative screenshot 600 of overall results of a manual or automatic review of a quality of an entire sample set. In FIG. 6, as shown, the user interface screen can provide suitable sampling statistics, such as total document families, percentage of sampling performed on the document families, percentage of incorrectly tagged samples, percentage of incorrectly tagged samples, changing of the sampling settings, and the like.

The above-described devices and subsystems of the illustrative embodiments can include, for example, any suitable servers, workstations, PCs, laptop computers, PDAs, Internet appliances, handheld devices, cellular telephones, smart phones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF)

communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A computer implemented system for validating a document classification process for eDiscovery, internal investigations, law enforcement activities, compliance audits, records management, legacy data clean-up, or defensible dispositions, the system comprising:
    a document collection of N documents related to eDiscovery, internal investigations, law enforcement activities, compliance audits, records management, legacy data clean-up, or defensible dispositions;
    a document classification process performed on the document collection;
    a random selection software module that when executed automatically generates a random validation set S of documents based on a user selectable percentage P of the N documents from the document collection; and
    a manual document review process performed on the random validation set of documents to validate overall results of all of the documents classified by the document classification process,
    wherein the system is configured to dynamically and in real-time measure and display on a computer display device a best case estimate of a duality of the results of the overall document classification process based on the documents that are validated, given the size N of a total data set of the document collection, and based on a predetermined quality threshold for an overall classification quality desired for the document classification process, and
    wherein the system is configured to employ automatic document classification methods including at least one of Technology Assisted Review (TAR), Predictive Coding, Machine Assisted Review (MAR), or Computer Assisted Review (CAR), support vector machines (SVM), naive-Bayes classifiers, k-nearest neighbors, rules-based classification, Linear discriminant analysis (LDA), Maximum Entropy Markov Model (MEMM), scatter-gather clustering, and hierarchical agglomerate clustering (HAC).

2. The system of claim 1, wherein the system is configured to process document sections including at least one of pages, paragraphs, chapters, and text sections.

3. The system of claim 1, wherein documents which are correctly classified by the reviewer, are used to train an automatic document classification process to recognize similar new documents coming from the entire data set dynamically in a background process,
    the new documents are then presented to the manual reviewer in order of how well they match to the classifier, with best matching documents presented first, and so that documents are no longer presented to the manual reviewer in random but rather a prioritized order, and
    precision and recall values are calculated automatically in a background process configured for measuring a quality of the trained automatic document classification process.

4. The system of claim 1, wherein the system is configured to employ at least one of Rag of Words (BOW), Term Frequency Inverse Document Frequency (TF-IDF), and semantic document representation schemes, including at least one of named entity extraction, and information extraction techniques.

5. The systems of claim 1, wherein instead of employing a random sampling process to build a training and test sets, a same sampling process is repeated a number of times and results of different efforts are averaged employing methods including tenfold cross validation.

6. The system of claim 1, wherein the system is configured to process multi-media files, including images, and audio and video recordings, and
    the system is configured to measure a quality of automatic detection of Personally Identifiable Information (PII) or Protected Health Information (PHI).

7. A computer implemented method for a system for validating a document classification process for eDiscavery, internal investigations, law enforcement activities, compliance audits, records management, legacy data cleanup, or defensible dispositions, the method comprising:
    providing a document collection of N documents related to eDiscovery, internal investigations, law enforcement activities, compliance audits, records management, legacy data cleanup, or defensible dispositions;
    performing a document classification process on the document collection;
    automatically generating with a random ;election software module that is executed a random validation set S of documents based on a user selectable percentage P of the N documents from the document collection; and
    performing a manual document review process on the random validation set of documents to validate overall results of all of the documents classified by the document classification process; and
    dynamically and in real-time measuring and displaying on a computer display device a best case estimate of a quality of the results of the overall document classification process based on the documents that are validated, given the size N of a total data set of the document collection, and based on a predetermined quality threshold for an overall classification quality desired for the document classification process, and
    wherein the system is configured to employ automatic document classification methods including at least one of Technology Assisted Review (TAR), Predictive Coding, Machine Assisted Review (MAR), or Computer Assisted Review (CAR), support vector machines (SVM), naive-Bayes classifiers, k-nearest neighbors, rules-based classification, Linear discriminant analysis (WA), Maximum Entropy Markov Model (MEMM), scatter-gather clustering, and hierarchical agglomerate clustering (HAC).

8. The method of claim 7, wherein the system is configured to process document sections including at least one of pages, paragraphs, chapters, and text sections.

9. The method of claim 7, wherein documents which are correctly classified by the reviewer, are used to train an automatic document classification process to recognize similar new documents coming from the entire data set dynamically in a background process, the new documents are then presented to the ma was reviewer in order of how well they match to the classifier, with best matching documents presented first, and so that documents are no longer presented to the manual reviewer in random but rather a prioritized order, and precision and recall values are calculated automatically in a background process configured for measuring a quality of the trained automatic document classification process.

10. The method of claim 7, wherein the system is configured to employ at least one of Bag of Words (BOW), Term Frequency Inverse Document Frequency (TF-IDF), and semantic document representation schemes, including at least one of named entity extraction, and information extraction techniques.

11. The method of claim 7, wherein instead of employing a random sampling process to build a training and test sets, a same sampling process is repeated a number of times and results of different efforts are averaged employing methods including tenfold cross validation.

12. The method of claim 7, wherein the system is configured to process multi-media files, including images, and audio and video recordings, and the system is configured to measure a quality of automatic detection of Personally identifiable Information (PII) or Protected Health Information (PHI).

13. A computer program product for a system for validating a document classification process for eDiscovery, internal investigations, law enforcement activities, compliance audits, records management, legacy data clean-up, or defensible dispositions and including one or more computer readable instructions embedded on a tangible, nontransitory computer readable medium and configured to cause one or more computer processors to perform the steps of;

providing a document collection of N documents related to eDiscovery, internal investigations, law enforcement activities, compliance audits, records management, legacy data clean-up, or defensible dispositions;

performing a document classification process on the document collection;

automatically generating with a random selection software, module that is executed a random validation set S of documents based on a user selectable percentage P of the N documents from the document collection; and performing a manual document review process on the random validation set of documents to validate overall results of all of the documents classified by the document classification process; and dynamically and In real-time measuring and displaying on a computer display device a best: case estimate of a quality of the results of the overall document classification process based on the documents that are validated, given the size N of a total data set of the document collection, and based on a predetermined quality threshold for an overall classification quality desired for the document classification process, and wherein the system is configured to employ automatic document classification methods including at least one of Technology Assisted Review (TAR), Predictive Coding, Machine Assisted Review (MAR), or Computer Assisted Review (CAR), support vector machines (SVM), naive-layes classifiers, k-nearest neighbors, rules-based classification, Linear discriminant analysis (LDA), Maximum Entropy Markov Model (MEMM), scatter-gather clustering, and hierarchical agglomerate clustering (HAC).

14. The computer program product of claim 13, wherein the system is configured to process document sections including at least one of pages, paragraphs, chapters, and text sections.

15. The computer program product of claim 13, wherein documents which are correctly classified by the reviewer, are used to train an automatic document classification process to recognize similar new documents coming from the entire data set dynamically in a background process, the new documents are then presented to the manual reviewer in order of how well they match to the classifier, with best matching documents presented first, and so that documents are no longer presented to the manual reviewer in random but rather a prioritized order, and precision and recall values are calculated automatically in a background process configured for measuring a quality of the trained automatic document classification process.

16. The computer program product of claim 13, wherein the system is configured to employ at least one of Bag of Words (BoW), Term Frequency Inverse Document Frequency (TF-IDF), and semantic document representation schemes, including at least one of named entity extraction, and information extraction techniques.

17. The computer program product of claim 13, wherein instead of employing a random sampling process to build a training and test sets, a same sampling process is repeated a number of times and results of different efforts are averaged employing methods including tenfold cross validation.

18. The computer program product of claim 13, wherein the system is configured to process multi-media files, including images, and audio and video recordings, and the system is configured to measure a quality of automatic detection of Personally Identifiable Information (PII) or Protected Health Information (PHI).

* * * * *